United States Patent Office 3,041,925
Patented July 3, 1962

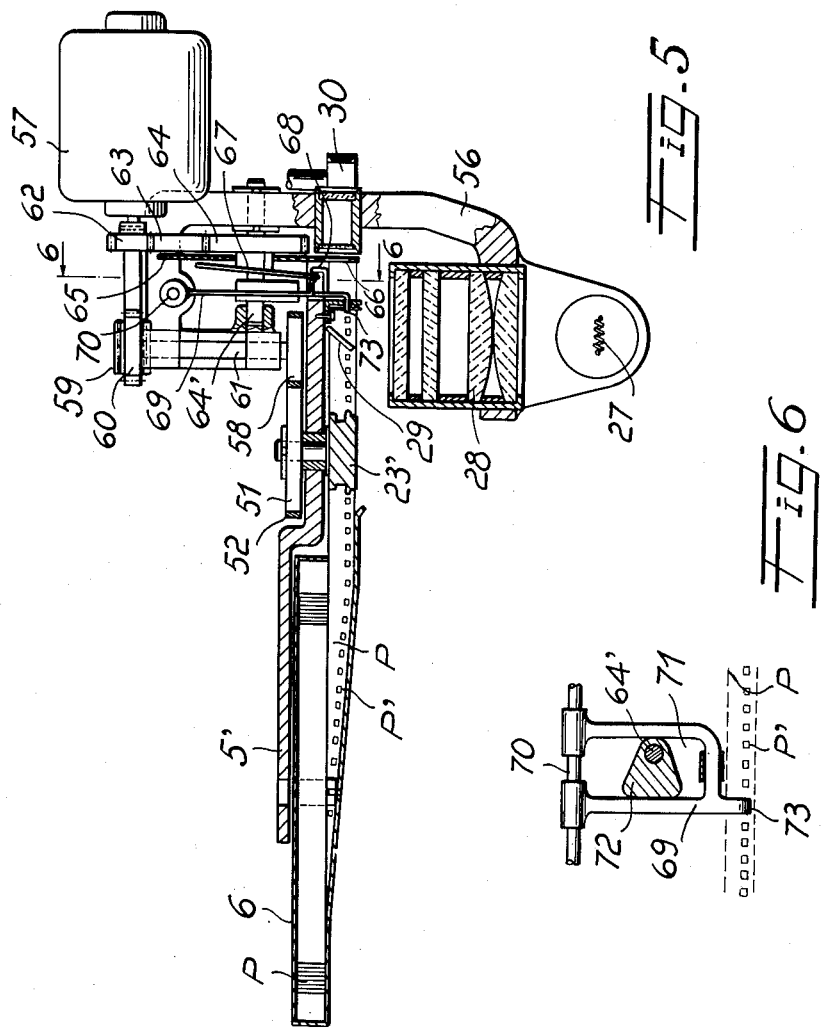

3,041,925
APPARATUS FOR THE AUTOMATIC PROJECTION UPON SELECTION OF SOUND FILMS
Vincenza Bavaro, Milan, Italy, assignor to Societa A.R.L.M.G.S.-Moviesbox General System, Milan, Italy, a corporation of Italy
Filed Oct. 11, 1960, Ser. No. 61,874
Claims priority, application Italy Oct. 15, 1959
11 Claims. (Cl. 88—16.2)

The present invention relates to an apparatus for the automatic projection of selected sound-films, initiated by the insertion of a coin into a suitable device, and having the purpose of projecting a sound-film previously selected from the film store of the apparatus.

It is one object of the present invention to provide an apparatus for the automatic projection of selected sound films which comprises, within an external and conveniently shaped housing, an axially rotatable collector supporting a plurality of sound-films incorporated within mobile projecting elements about a laterally disposed pivot, and adapted to be selected from the outside of the housing by means of transmission members properly disposed, in order to be manually actuated by the user after the insertion of a coin, further driving means for moving the projection elements to the position of operation, and still further driving means for controlling the sound-film properly inserted within a fixed optical system, common to all mentioned elements for projection, by means of which optical system the sound films, properly inserted by optical and mechanical localising devices, are projected onto a screen by means of adapted and conveniently disposed mirrors within the housing. The latter comprises also a magnetic head connected to the mentioned optical system for controlling the sound track through a conventional loudspeaker, while an electromagnetic device, fed by an electric circuit closed by the insertion of a coin and also connected with the driving means for the movement of the projection elements, is provided for the engagement and disengagement, respectively, of the conveying means of the collector, every projection element being provided with guiding means for the film enclosed within a cylindrical box disposed on the side of the projection element, and from which the film is unwound, and in the same time rewound during the entire projection period by rolling upon guiding rolls disposed perimetrically and properly within each box.

With these and other objects in view, which will become apparent in the following detailed description, the present invention will be clearly understood in connection with the accompanying drawings, in which:

FIG. 5 is a section along the lines 5—5 in FIG. 4; and

FIG. 6 is a section along the lines 6—6 of FIG. 5.

Figure 1:
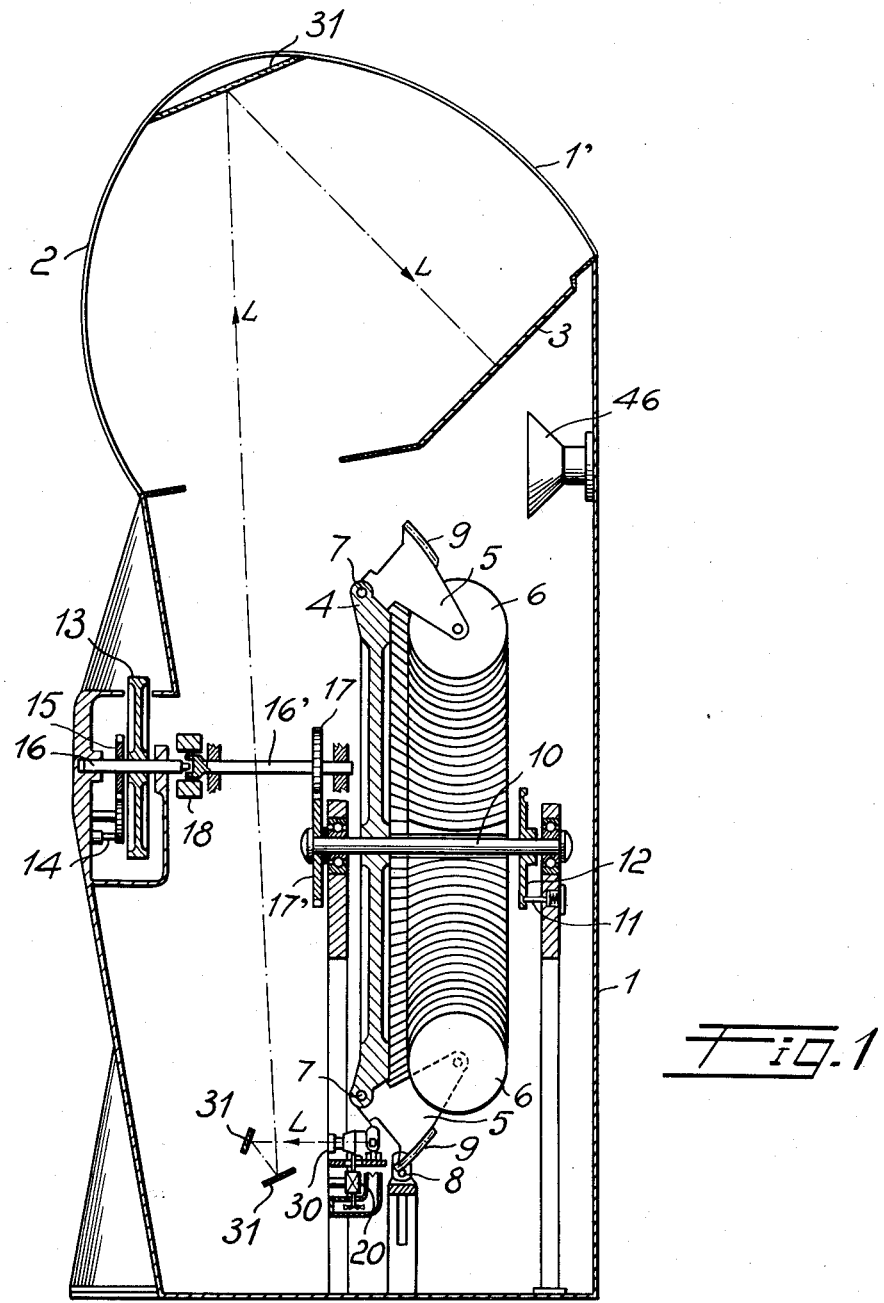
FIGURE 1 is an axial, vertical cross section of the apparatus disclosing the essential elements thereof.
Figure 2:
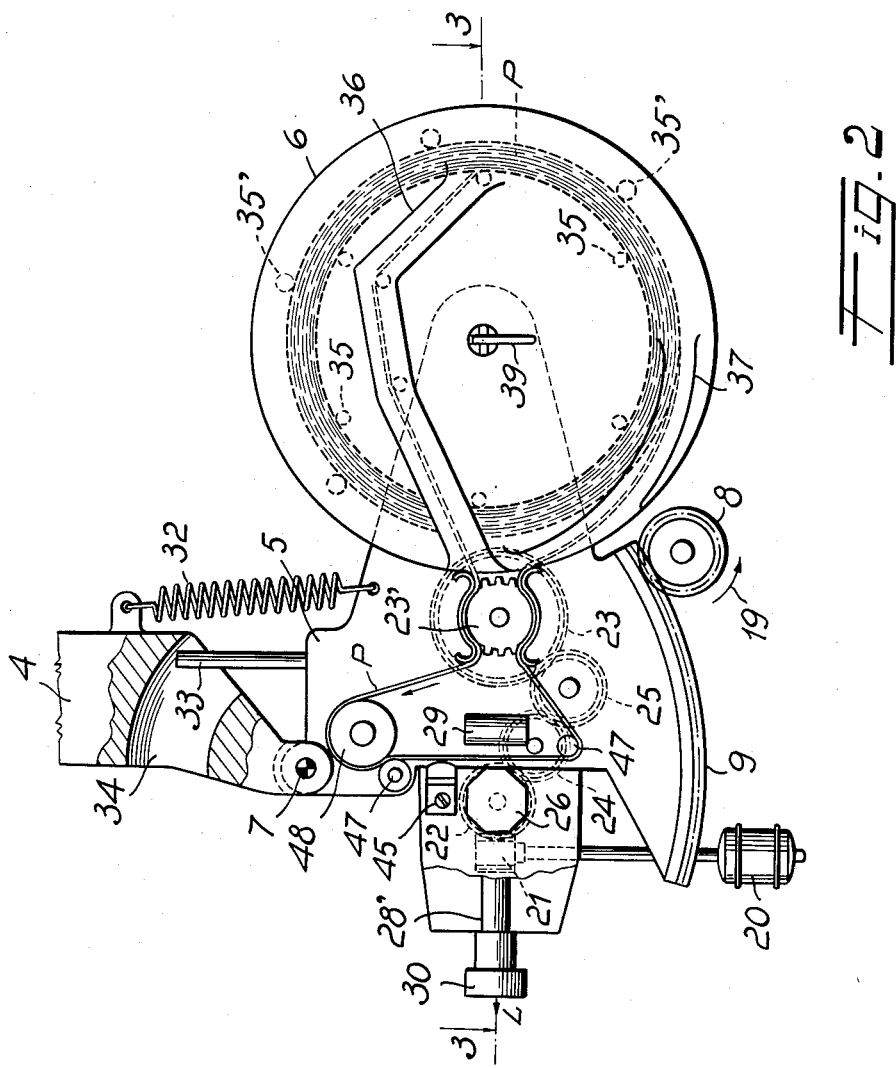
FIG. 2 is a side elevation of an embodiment of the projection element shown at larger scale.
Figure 3:
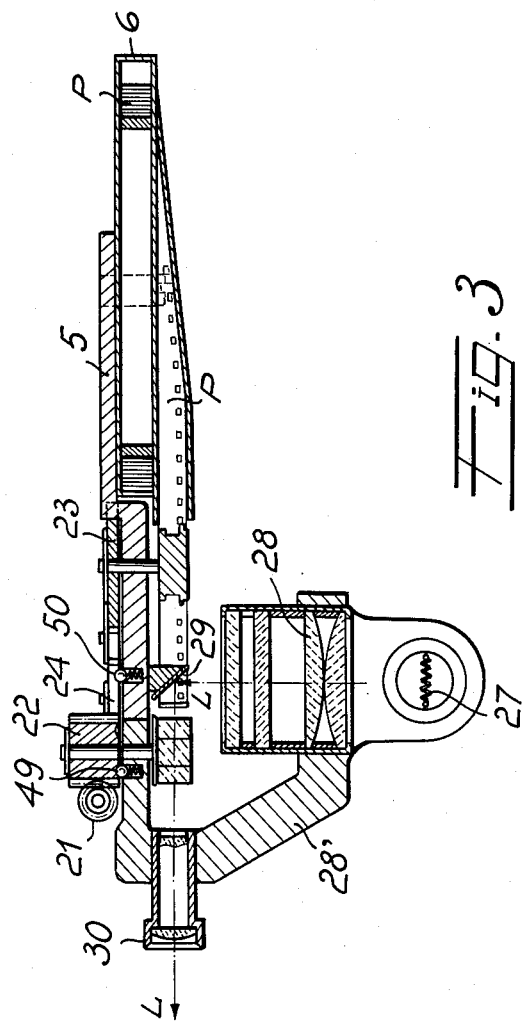
FIG. 3 is a cross-section along the lines 3—3 in FIG. 2.

Referring now to the drawings, and in particular to FIGS. 1 to 3, the apparatus designed in accordance with the present invention is disposed within a housing 1 provided with a head 1' disposed at its front portion, and the head 1 includes a transparent window 2 for the viewing of a sound film on the screen 3 disposed in proper position in the housing 1, and on which the sound films, in accordance with another feature of the present invention, are projected in order to avoid diffusion.

Within the housing 1, more precisely underneath the head 1', there are disposed the following members: the rotatable film collector provided with a plurality of projection elements, a gear train for the selector, the driving means for the conveyance of the projection elements, further driving means for the film, the optical system, the sound reproducing system, all the necessary supporting elements for the moving parts of the apparatus, for localizing the film, and any further members, as described below.

The mentioned film collector A comprises a wheel 4 which rotates upon its axis, and serves the purpose of supporting in a concentrical, biased position a plurality of arms 5 incorporating the moving members of the selected film, and also supporting the film bearing box 6. These members are disposed next to each other, in circular arrangement. Each one of the arms 5 is connected to the wheel 4 by means of a pivot 7, in order to permit movement of the arms 5 from the position in FIG. 1 to the working position of FIG. 2, due to the rotation of the pinion 8 which engages the sector 9 disposed below the mentioned members.

The teeth of the pinion 8 and/or of the sector 9 are laterally chamfered in order to permit passage of all elements between the gap of the teeth of the pinion 8 and vice versa, when the wheel 4 of the collector A rotates about its own axis for the purpose of selecting a predetermined film by means of the shaft 10 to which the wheel 4 is keyed, and which wheel 4 may be stopped step by step by means of the elastical, mechanical stopping pin 11, which engages the disc 12 having a plurality of circularly disposed bores and the disc 12 being mounted on the shaft 10, and as a result of the manual action imposed upon the wheel 13, which controls the selection, and which wheel 13 can also be stopped by means of a further elastic pin stopping device 14 and another disc 15 having a plurality of bores to receive selectively the pin stopping device 14. The wheel 13 for controlling the selection drives the shafts 16 and 16' which are capable of transmitting the movement of manual rotation to the mentioned shaft 10 of the collector through the gears 17 and 17' due to the operation of an electromagnetical coupling 18 capable of coupling the shafts 16 and 16', when the electromagnet of the coupling 18 is excited by an electric pulse imparted by the insertion of a coin into the apparatus, so as to cause also the start of the electric motor (not shown), in order to rotate the pinion 8 in the direction of the arrow 19 (FIG. 2) in order to bring the selected element in position for projection.

In this position of projection, and under the control of a time-delay switch (not shown), a second electric motor 20 (FIG. 2) is started, which motor 20 is mounted in the apparatus, and in accordance with one embodiment of the present invention, drives the endless screw 21 engaged with the worm gear 22, so as to transmit the rotary movement over a gear train to the gear 23 mounted on a shaft carrying the gear 23' which drives the film P, by means of the gears 25 and 24, the last being constantly engaged with the gear 22, when the projection element is in the working position, and while a prism 26 for the stoppage of the images of the film P is coaxially disposed with the worm gear 22.

An electric lamp 27 (FIG. 3) and an optical condenser 28, supported by the arm 28', function as a light source for feeding a light beam L through the film by means of the interposition of a reflecting mirror 29 which is disposed at a predetermined angle opposite the elastic lamp 27.

The objective 30 and additional mirrors 31 in the housing 1 (FIG. 1) project the images onto the screen 3 for the viewing of the selected film.

Each of the projection elements is supported in its inoperative position by a spring 32 and is guided in a cycle of exposure and blocking by means of a small rod 33 which introduces a slit 34 provided for in wheel 4 of the collector.

Usually the film containing boxes 6 are cylindrical in shape, and the film is disposed therein in a spirally wound form between opposed rollers 35 and 35' for the purpose of guiding the film and for compensating the peripherical speeds, the film being received from the boxes 6 by means of the gear 23' inside of the boxes 6, and returned into the boxes along the guides 36 and 37, respectively, and the guides 36 and 37 are also provided with guiding rollers. A cover is provided in the boxes 6 in order to maintain the film within the boxes 6, the cover being in turn held in place by an arm 5 with a securing member 39.

A magnetic head 45 is disposed in front of the film in order to transmit the sound to the space surrounding the housing 1 by loudspeaker 46, which may be disposed in any selected position within the housing 1. Friction rollers 47 and a pulley 48, acting as a flywheel, are provided for controlling the unwinding and rewinding, respectively, of the film P.

In order to have the film P at any time ready for a new projection, there are provided, according to the present invention, spring biased positioning devices 49 and 50, advantageously in the form of balls, which tend to stop the gears 22 and 24, in order to coincide the images exactly with the faces of the prism 26.

The operation of the apparatus is performed in the following manner:

At first a coin is inserted into a slot (not shown) provided in the housing 1, which coin causes excitement of the electromagnet 18 (FIG. 1) by corresponding controlling switches for closing a predetermined electric circuit, in order to cause the coupling of the shafts 16 and 16'.

After the film has been selected, by moving to the left or to the right the wheel 13 which controls the selection, upon pressing down a push button (not shown), the exciting feeding circuit for the motor is closed to actuate the pinion 8, in order to set the selected projection element 5 and 6 from its inoperative position, as shown in FIG. 1, into the operative position, as shown in FIG. 2. Successively, and with sufficient time-delay, another switch (not shown) automatically starts the motor 20 for driving the film P, thus showing the images of the film P at the screen 3.

When the film P has been entirely rewound in the corresponding box 6, still another switch is actuated in order to rotate the pinion 8 in the direction opposite to that of the arrow 19, in order to return the projection element to its inoperative position, as shown in FIG. 1, thus swinging it about the pivot 7.

Figure 4:
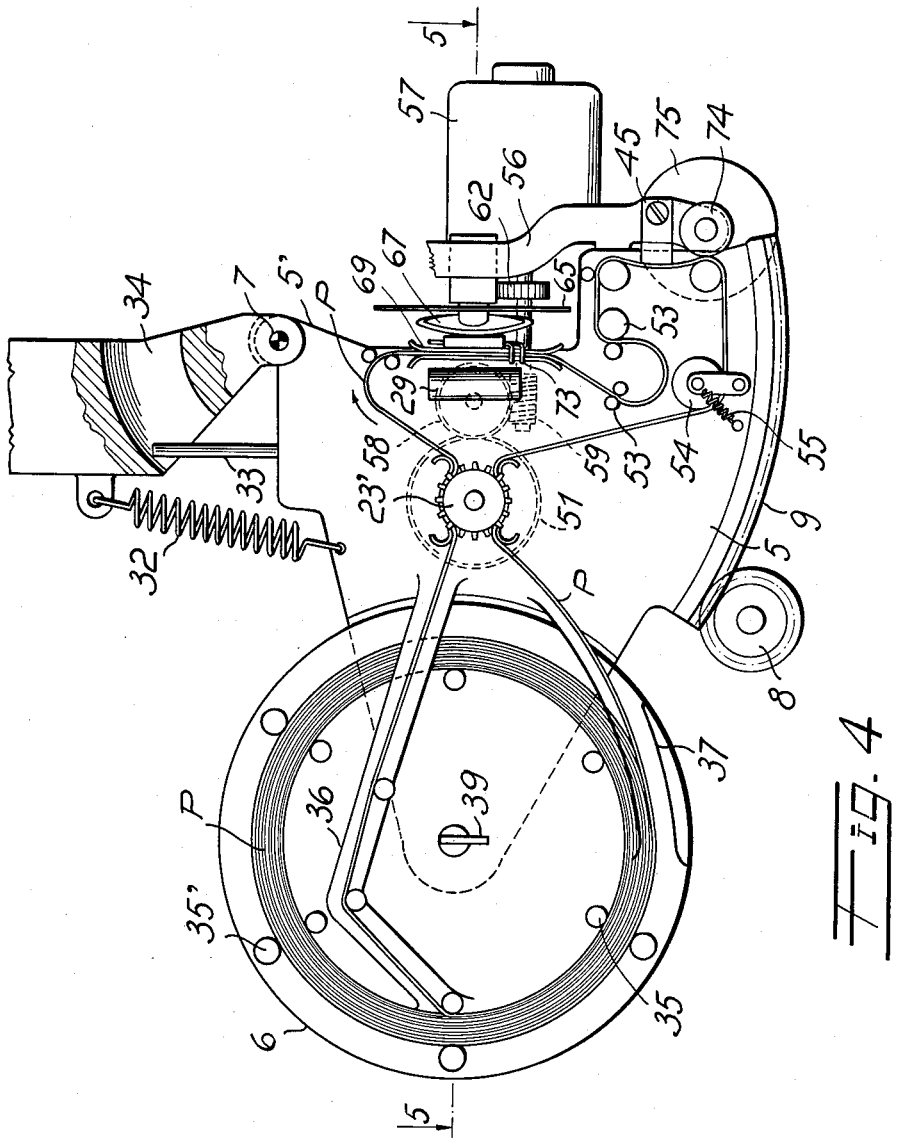
FIG. 4 is a side elevation of another embodiment of the projection element.

Referring now to FIGS. 4 to 6, which represent a second embodiment of the present invention in regard to the locating of the images of the film P, and the control of the film P within the corresponding projection element, the toothed wheel 23' is disposed coaxially with a friction wheel 51 which is covered at its periphery with a layer of rubber or the like, while the film P has to travel the track imposed by the friction rollers 53 and the film guide 54 which is biased by the spring 55.

The coupling may be advantageously formed by at least two toothed wheels, preferably with sharp V-thread, in order to avoid mechanical difficulties in the coupling.

The immovable part of the optical system 27 and 28, and the projection element being in operative connection with the optical system 27 and 28, permit the reproduction of the images. The immovable part comprises a support 56 for supporting the projection elements, and supporting also the electric motor 57 which drives the friction wheel 58 through the endless screw 59 and the worm gear 60 in operative connection with the shaft 61 of the friction wheel 58, the latter transmitting the movement to the friction wheel 51 connected to the toothed wheel 23' for driving the film P, when the projection element 5 assumes the operative position.

The electric motor 57 drives by means of the gear 62 and the intermediate gear 63 the gear 64 which supports coaxially the shutter 65 provided with a small window 66 for the passage of the images therethrough.

A disc 67, disposed in biased position and connected with the gear 64, is engaged by a smooth action of friction, for instance, by means of rolling balls, with a projection 68 of a claw 69 which is fulcrumed at its end on a pivot 70, so that the claw 69 may freely oscillate about and slide axially along the pivot 70.

A properly shaped cam 72 is disposed within the space 71 of the claw 69 (FIG. 6) the cam 72 to be rotated by the shaft 64' of the gear 64 so as to cause lifting and lowering of the claw 69 in synchronisation with the movement of the cam 72.

The claw 69 inferiorly terminates by two short, angular projections 73 which enter the perforations P' provided in the film P, in order to advance the film P, in successive steps each time the biased disc 67 causes, during its rotation, the projections 73 to engage the film P.

A feeding wheel 74, properly supported by the support 56, and peripherally covered with rubber, will hold the film P in tension by means of a controlling flywheel 75, which directly or indirectly coupled with the feeding wheel 74.

The operation of the apparatus according to the second embodiment of the present invention is as follows:

After having inserted the preselected element of projection with the fixed part of the optical members 27, 28 and 30 by means of the electric motor, the friction wheels 51 and 58 are coupled so as to move the film P within the range of the optical members 27, 28 and 30 to the action of the electric motor 57.

Simultaneously, the electric motor 57 actuates the oscillating claw 69, so as to advance the film step by step, and in perfect synchronism with the shutter 65, each time the angular projections 73 of the claw 69 enter the perforations of the film P.

When the viewing and audition of the film P are finished, the mobile element which receives the film P is contained, is returned to its inoperative position, thus swinging about the pivot 7 due to the action of the electric motor 8 which turns now in reverse direction, while the immovable part 56, which supports the optical members 27, 28 and 30 and the electric motor 57, remains in position ready to project another film, thus using again the same optical elements for projecting and producing the sound of another film.

While several embodiments of the present invention have been disclosed, these embodiments are given by example only and not in a limiting sense, the scope of the present invention being determined by the object and the claims.

I claim:

1. An apparatus for the automatic projection of a sound film selected from a plurality of sound films, comprising a housing, a film collector including a plurality of movable film carrying elements, means for moving said film carrying elements from an inoperative position into an operative position, said film collector including further an immovable optical system adapted to cooperate with each of said sound films disposed in said respective film carrying elements upon moving the latter into operative projection position, said optical system including a light source and a plurality of reflection mirrors disposed in said housing, a screen disposed in said housing and a window forming part of said housing and disposed opposite said screen to permit viewing of said screen from outside of said housing, the last one in the series of said plurality of mirrors being disposed in said housing to reflect a light beam substantially perpendicularly onto said screen, a magnetic head in synchronism with said optical system, coin receiving means in said housing, manually operated film selecting means, a shaft having two parts, a coupling connecting said parts, electric driving means for operation of said film carrying elements, an electromagnet, a circuit including said electric driving means and said electromagnet, the latter rendering operative said coupling in response to the insertion of a coin into said coin receiving means, each of said film carrying elements comprising a box receiving the corresponding of said sound films and disposed laterally with respect to the corresponding of film carrying elements, means for winding and unwinding, respectively, each of said films in the operative position thereof within the range of said optical system for projection and sound-production of said film, and guiding and tensioning rollers in said box to feed said film past said optical system.

2. The apparatus, as set forth in claim 1, which includes means for advancing said sound film past said optical system.

3. The apparatus, as set forth in claim 1, which includes additional movable driving means for each of said film carrying elements.

4. The apparatus, as set forth in claim 1, wherein said film collector comprises a wheel, means for operating said wheel from the outside of said housing, and said film carrying elements include an arm fulcrumed on one side of said wheel, and said film boxes are supported exchangeably on said arm, and a toothed sector carried by said arm, and a driving pinion engaging said toothed sector, said pinion being driven by said electric motor excited in response to the insertion of a coin.

5. The apparatus, as set forth in claim 1, which includes means for positioning a selected one of said sound films in the appropriate position for the projection and sound production.

6. The apparatus, as set forth in claim 1, wherein said driving means for advancing said sound film comprises an endless screw mounted on a shaft of said motor, and one or more gears for transmitting the rotary motion.

7. The apparatus, as set forth in claim 1, which includes locating means for said sound film comprising a rotatable prism moved together with said means for advancing said sound film.

8. The apparatus, as set forth in claim 1, which includes locating means for said sound film, an oscillating claw provided with two projections for advancing said sound film and said locating means comprising a shutter rotatable in synchronism with said oscillating claw.

9. The apparatus, as set forth in claim 8, wherein said claw comprises a biased disc and a cam, and means for rotating the latter for operation of said claw.

10. The apparatus, as set forth in claim 1, wherein said feeding means for said sound film comprises at least one tensioning roller, a spring biasing said roller and said tensioning roller being covered at its periphery with a rubber layer.

11. The apparatus, as set forth in claim 1, which includes a mechanical coupling between said electric motor and said toothed wheel for advancing said sound film, and said coupling comprises an endless screw engaging a worm gear and a pair of friction wheels.

References Cited in the file of this patent
UNITED STATES PATENTS

| | | |
|---|---|---|
| 2,206,134 | Streyckmans | July 2, 1940 |
| 2,625,073 | Young et al. | July 13, 1953 |